No. 792,138.                                    Patented June 13, 1905.

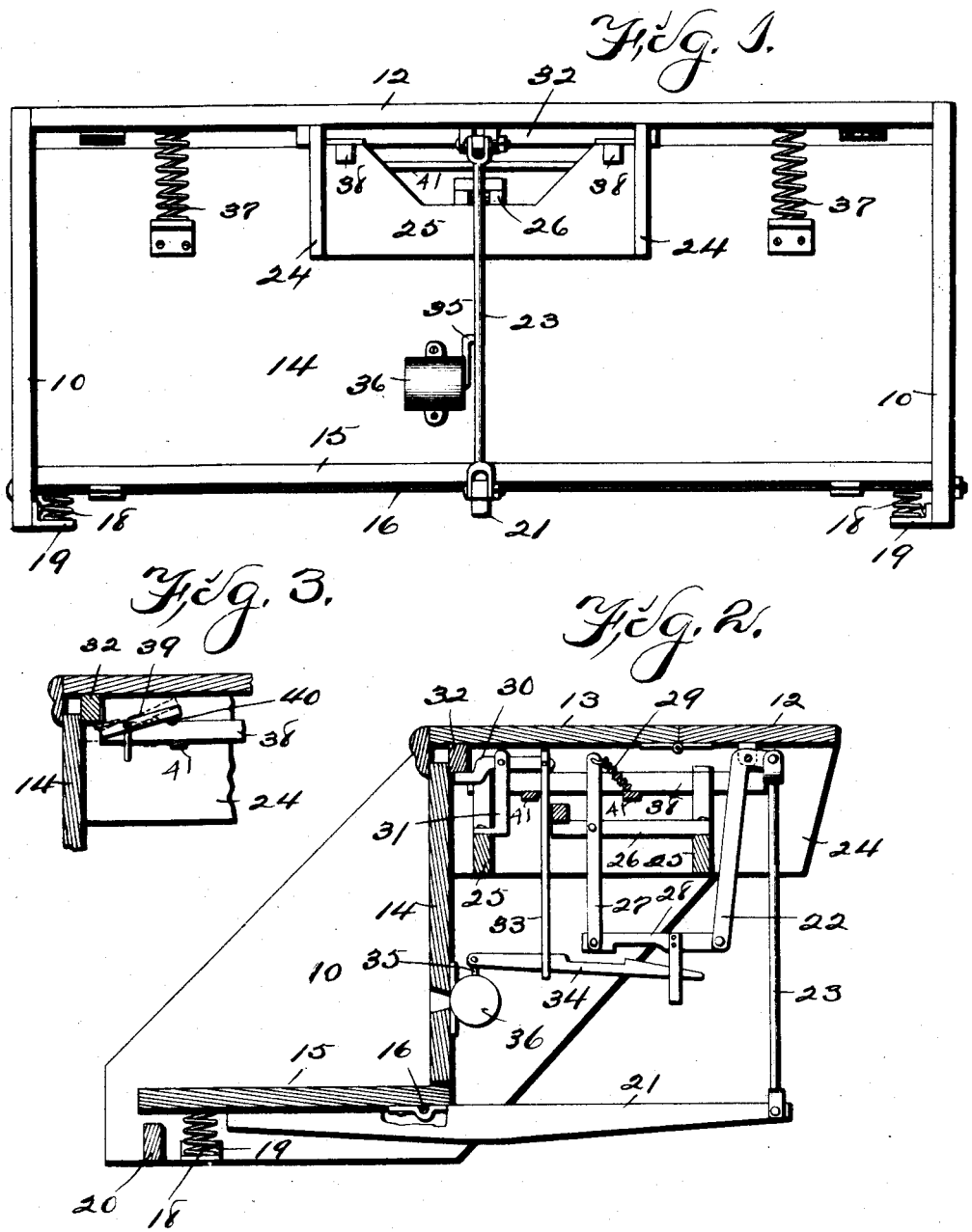

UNITED STATES PATENT OFFICE.

FREDERICK L. KAUFFMAN, OF DES MOINES, IOWA.

AUTOMATIC PASSENGER-REGISTER FOR CARS.

SPECIFICATION forming part of Letters Patent No. 792,138, dated June 13, 1905.

Application filed October 28, 1904. Serial No. 230,428.

*To all whom it may concern:*

Be it known that I, FREDERICK L. KAUFFMAN, a citizen of the United States, residing at Des Moines, in the county of Polk and State of Iowa, have invented a new and useful Automatic Passenger-Register for Cars, of which the following is a specification.

My object is to prevent erroneous reports being made of the number of passengers carried on a car during a trip from one station to another or from a depot to the limit of a line or road and a return to the depot to make a full round trip by placing on a car mechanism that will be operated by the weight of each passenger by passing out over the steps as required to automatically register each passenger as they successively leave a car.

My invention consists in the construction, arrangement, and combination of elements and subcombinations, as hereinafter set forth, pointed out in my claims, and illustrated in the accompanying drawings, in which—

Figure 1 is a rear view of car-steps that show my automatic mechanism attached to the under sides of the steps and the riser at the front of the step and springs fixed to the end portions of the riser that normally retain a hinged portion of the top elevated, as required to be on a level with the fixed part of the top. Fig. 2 is a transverse sectional view of Fig. 1 and shows the positions of all the operative elements relative to each other and the step and the fixed ends of the steps. Fig. 3 shows a device for locking the hinged portion of the upper step, as required to prevent it from rising to its normal position until passenger when passing from car has left the lower step.

The numerals 10 designate the ends of the steps, 12 the rear portion of the upper step, fixed to the ends 10, and 13 the front part of the upper step, hinged to the front edge of the fixed part 12, as clearly shown in Fig. 2. The riser 14 is fixed to the ends of the steps in such a manner that it will support the steps when a person treads thereon, as required in getting off a car. The lower step 15 is connected with a rod 16, that is fixed in the lower corner portions of the ends 10, as shown, or in any suitable way, in such a manner that the step can move up and down under the tread of persons leaving the car. Coil-springs 18 are fixed to the insides and bottoms of the ends by means of angle-irons 19 or in any suitable way in such a manner that they will normally retain the step 15 elevated, as shown in Fig. 2. Stops 20 are fixed to the ends 10 to restrict the downward motion of the step.

A bar 21 is fixed to the under side and center of the step 15 to serve as the long arm of a lever, and an elbow-shaped lever 22 is fulcrumed to the stationary part 12 of the upper step and pivotally connected with the free end of the bar 21 by a rod 23.

A four-sided frame, composed of parallel sides 24 and cross-pieces 25, is fixed to the under side and central portion of the stationary part 12 of the upper step, and a bearer 26, fixed to one of the cross-pieces 25 to support a lever 27, pivoted thereto and connected at its lower end and long arm with the lower end and long arm of the lever 22 by a notched bar 28. A spring 29, fixed to the top of the lever 27, allows lever 27 its necessary play when step 13 is compressed. A lever 30 is fulcrumed to a bearer 31, fixed to one of the sides 25 of the frame, to engage a cleat 32, fixed to the under side of the front portion of the hinged portion 13 of the upper step, and a hanger 33 is pivotally connected with the inner end of the lever 30 and has a slot in its lower end portion, through which a notched bar 34 is extended and adapted to engage the notched bar 28 when it is lifted by the lever 30 when a person in getting off the car treads upon the upper step 13. As the passenger steps from step 13 to step 15 the step 15 is depressed and the lever 22 will be actuated, as required, to impart a reciprocating motion to the notched bar 28, as required, to impart a reciprocating motion to the notched bar 34 and to operate the crank 35 of an automatic register 36, fixed to the inside of the riser 14. An aperture in the riser 14 permits a person in front of the steps to see the dial of the register, as required, to know at any time how many passengers have descended from the car over the steps, and every time one person has left the lower step the pressure upon it is relaxed and by means of the springs 18 elevated to its normal position and in readiness to be depressed by another passenger, and thus all the passengers in a car will be automatically counted and their number registered.

The two bars 38 are set in grooves at the upper and outer edges of the two parallel sides 25 of frame and are rigidly connected to each other by means of two cross-pieces 41. The said two bars 38 are so adjusted as to slide under cleat 32 when step 13 is in its normal position, and thereby prevent step 13 from depressing as passenger steps on lower step of car when boarding car.

The upper end of lever 27 is attached to the middle of the rear cross-piece 41 by means of coil-spring 29, which imparts a reciprocating motion to the two bars 38 from lever 27 as lever 27 is actuated by the depressing of step 15.

To prevent step 13 from rising to its normal position until a passenger in getting off the car has left step 15, I have the locking device shown in Fig. 3. The bar 39 is fulcrumed to the rigid side 25 of frame and hinged to cleat 32. A rod 40, actuated by connection with the top end of the lever 27, is so adjusted as to pass under the end of bar 39 when step 13 is depressed.

Having thus set forth the purpose of my invention and the construction and function of each part and the arrangement and combination of all the elements and subcombinations, the practical operation and utility thereof will be obvious to persons familiar with the art to which it pertains.

What I claim as new, and desire to secure by Letters Patent, is—

1. In an automatic passenger-register for cars, a step adjustably connected with the fixed end of the step, the rear section of a second step fixed to the ends of the step and the front section hinged to the rear section, for the purposes stated.

2. In an automatic passenger-register for cars, a step adjustably connected with the fixed end of the step, the rear section of a second step fixed to the ends of the step and the front section hinged to the rear section, a riser fixed to the ends of the steps an automatic register fixed to the rear side of the riser and the riser provided with an aperture to make the dial of the register visible, arranged and combined to operate in the manner set forth for the purposes stated.

3. In an automatic passenger-register for cars, a step adjustably connected with the fixed ends of the step, the rear section of a second step fixed to the ends of the step and the front section hinged to the rear section, a riser fixed to the ends of the step, an automatic register fixed to the rear side of the riser and the riser provided with an aperture to make the dial of the register visible, a crank extended from the register and means to impart intermittent reciprocating motions to the crank, arranged and combined to operate in the manner set forth for the purposes stated.

4. In an automatic passenger-register for cars, a step adjustably connected with the fixed ends of the step, the rear section of a second step fixed to the ends of the step and the front section hinged to the rear section, a riser fixed to the ends of the step, an automatic register fixed to the rear side of the riser and the riser provided with an aperture to make the dial of the register visible, a crank extended from the register and a notched bar pivotally connected with the crank to impart intermittent reciprocating motions to the crank, arranged and combined to operate in the manner set forth for the purposes stated.

5. In an automatic passenger-register for cars, a step having its rear portion fixed and its front section hinged to the front edge of the rear section and a cleat fixed to its under side, a riser fixed to the ends of the steps, a frame fixed to the under side of the fixed portion of the step, a lever fulcrumed to the frame, a hanger pivoted to the end of the lever and a notched bar extended through a slot in the lower end of the hanger, arranged and combined to operate in the manner set forth for the purposes stated.

6. In an automatic passenger-register for cars, a step having its rear portion fixed and its front section hinged to the front edge of the rear section and a cleat fixed to its under side, a riser fixed to the ends of the steps, a frame fixed to the under side of the fixed portion of the step, a lever fulcrumed to the frame, a hanger pivoted to the end of the lever, a notched bar extended through a slot in the lower end of the hanger, a register fixed to the riser and a crank extended from the register pivotally connected with said notched bar and means to reciprocate the notched bar, arranged and combined to operate in the manner set forth for the purposes stated.

7. In an automatic passenger-register for cars, a step having its rear portion fixed and its front section hinged to the front edge of the rear section and a cleat fixed to its under side, a riser fixed to the ends of the step, a frame fixed to the under side of the fixed portion of the step, a lever fulcrumed to the frame, a hanger pivoted to the end of the lever, a notched bar extended through a slot in the lower end of the hanger, a register fixed to the riser and a crank extended from the register pivotally connected with said notched bar and means to reciprocate the notched bar, a step fixed to the bottom of the riser, a rod movably connected with the ends of the step under its rear end, springs fixed to the ends of the step under the front portion of the step and means fixed to the ends of the step to restrict the downward pressure of the step, arranged and combined to operate in the manner set forth for the purposes stated.

8. In an automatic passenger-register for cars, a step having its rear portion fixed and its front section hinged to the front edge of the rear section and a cleat fixed to its under side, a riser fixed to the ends of the steps, a frame fixed to the under side of the fixed portion of the step, a lever fulcrumed to the frame, a hanger pivoted to the end of the lever, a notched bar extended through a slot in the lower end of the hanger, a register fixed to the riser and a crank extended from the register pivotally connected with said notched bar and means to reciprocate the notched bar, a step at the bottom of the riser supported at its rear edge by a rod connected with the ends of the step under its rear end, springs fixed to the ends of the step under the front portion of the step and means fixed to the ends of the step to restrict the downward pressure of the step, a bar fixed under the center of the step to extend rearward and a lever fulcrumed to the under side of the fixed portion of the upper step and connected with the end of said bar, arranged and combined to operate in the manner set forth for the purposes stated.

9. In an automatic passenger-register for cars, a step having its rear portion fixed and its front section hinged to the front edge of the rear section and a cleat fixed to its under side, a fixed riser, a frame fixed to the under side of the fixed portion of the step, a lever fulcrumed to the frame, a hanger pivoted to the end of the lever, a notched bar extended through a slot in the lower end of the hanger, a register fixed to the riser and a crank extended from the register pivotally connected with said notched bar and means to reciprocate the notched bar, a step supported upon a rod connected with the ends of the step under its rear end, springs fixed to the ends of the step under the front portion of the step and means fixed to the ends of the step to restrict the downward pressure of the step, a bar fixed under the center of the step to extend rearward, a lever fulcrumed to the under side of the fixed portion of the upper step and connected with the end of said bar, a second lever fulcrumed to the frame and a notched bar pivotally connected with the lower ends of the two levers, arranged and combined to operate in the manner set forth for the purposes stated.

10. In an automatic passenger-register for cars, a step having its rear portion fixed and its front section hinged to the front edge of the rear section and a cleat fixed to its under side, a fixed riser, a frame fixed to the under side of the fixed portion of the step, a lever fulcrumed to the frame, a hanger pivoted to the end of the lever, a notched bar extended through a slot in the lower end of the hanger, a register fixed to the riser and a crank extended from the register pivotally connected with said notched bar and means to reciprocate the notched bar, a step supported on a rod connected with the ends of the step under its rear end, springs fixed to the ends of the step under the front portion of the step and means fixed to the ends of the step to restrict the downward pressure of the step, a bar fixed under the center of the step to extend rearward, a lever fulcrumed to the under side of the fixed portion of the upper step and connected with the end of said bar, a second lever fulcrumed to the frame and a notched bar pivotally connected with the lower ends of the two levers and means to retain the hinged portion stationary when depressed, arranged and combined to operate in the manner set forth for the purposes stated.

FREDERICK L. KAUFFMAN.

Witnesses:
L. H. ORWIG,
TAOMAS G. ORWIG.